March 12, 1963 T. A. JULIAN ETAL 3,081,380
AUTOMATIC-GAIN-CONTROL APPARATUS
Filed May 23, 1960
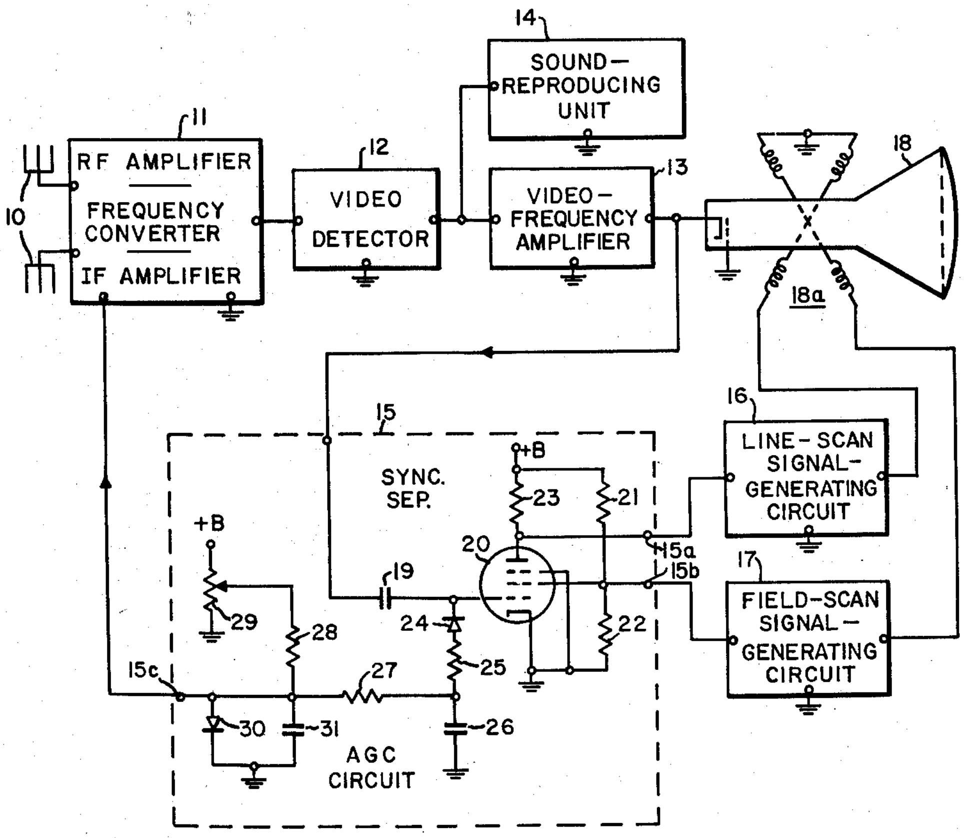

United States Patent Office 3,081,380

Patented Mar. 12, 1963

3,081,380

AUTOMATIC-GAIN-CONTROL APPARATUS

Thomas A. Julian, East Horsley, and Harry A. R. Wiggins, Chesham, England, assignors to Hazeltine Research, Inc., Chicago, Ill., a corporation of Illinois Filed May 23, 1960, Ser. No. 30,936
Claims priority, application Great Britain July 21, 1959
1 Claim. (Cl. 178—7.3)

This invention relates to an automatic-gain-control (AGC) circuit of the type used in a television receiver.

It is an object of the invention to provide a simple and inexpensive high gain AGC circuit control voltage for use in low-cost television receivers.

In accordance with the invention, an automatic-gain-control circuit for a television receiver comprises means for supplying a television signal including video and synchronizing portions recurring at a predetermined rate and having a peak-to-peak voltage amplitude subject to slow variations relative to said predetermined rate and means responsive to the signal for inserting a D.-C. component into the signal by setting one of the voltage peaks at a fixed potential. The circuit also includes means including a unidirectionally conductive device and a capacitor in series coupled to the insertion means and responsive to the video signal for detecting the peak-to-peak voltage amplitude of the signal and means for deriving an output voltage from across the capacitor.

For a better understanding of the present invention, together with other and further objects thereof, reference is had to the following description, taken in connection with the accompanying drawing, and its scope will be pointed out in the appended claim.

Referring to the single FIGURE of the drawing, there is shown a circuit diagram, partly schematic, of a television receiver embodying the present invention for receiving television signals of the conventional type.

In the receiver illustrated in the drawing, a television signal, modulated on a carrier wave and having the well-known synchronizing and video portions recurring at line frequency, is coupled from an antenna 10, 10 through a conventional arrangement of input circuits 11, including a radio-frequency (RF) amplifier, frequency converter, and one or more intermediate-frequency (IF) amplifiers, to a video detector 12, the output of which is coupled to a video-frequency amplifier 13. The output of video detector 12 is also coupled to sound-reproducing unit 14, which may comprise conventional circuits such as a sound IF circuit, sound signal detector, audio amplifier, and loudspeaker. Video detector 12 and video-frequency amplifier 13 are arranged in any well-known manner so that the television signal at the output of video-frequency amplifier 13 is such that the synchronizing pulses constitute the most positive parts of the signal. The signal is then applied to the cathode of a cathode-ray tube 18 arranged, along with beam-deflection windings 18*a*, to reproduce the picture represented in the aforementioned video portions of the signal.

The television signal appearing at the output of the video-frequency amplifier 13 is also coupled to circuit 15, the details of which will be described more fully hereinafter in connection with the preferred embodiment of the invention. Generally, circuit 15 may include a conventional synchronizing pulse separator circuit adapted to provide, at output terminals 15*a* and 15*b*, synchronizing pulses separated from the video portions of the television signal. These synchronizing pulses at terminals 15*a* and 15*b* are then coupled respectively to line-scan signal-generating circuit 16 and field-scan signal-generating circuit 17 which are, in turn, coupled to deflection windings 18*a* to provide the necessary beam raster for reproducing the image in tube 18. Circuit 15 also provides, in a manner to be described, an AGC potential at output terminal 15*c* which is coupled to the appropriate stages of input circuits 11, for example, to the biasing circuits for the control grids of the valves in the RF and IF amplifiers.

Referring now more particularly to circuit 15, as it is constructed in accordance with a preferred form of the invention, the automatic-gain-control circuit includes means for supplying all the A.-C. components of the aforementioned television signal with a high composite peak-to-peak amplitude relative to its detected amplitude. This means may include the connection from video-frequency amplifier 13 through capacitor 19 to the control grid of an electronic valve, for example, pentode 20.

The automatic-gain-control circuit also includes means responsive to the television signal for inserting a D.-C. component into the signal by setting one of the voltage peaks of the signal at a fixed potential, for example, ground. This includes the control grid and cathode of pentode 20, which tube is part of the synchronizing signal separator circuit. The cathode and suppressor grid of pentode 20 are directly connected to ground, the screen grid of pentode 20 being connected to the junction of two resistors 21 and 22, connected in series between the terminals of a constant voltage source +B whose negative terminal is connected to ground. The anode of pentode 20 is connected to the positive terminal of voltage source +B through a load resistor 23.

The automatic-gain-control circuit also includes means including a unidirectionally conductive device and a capacitor in series coupled to the potential setting means and responsive to the video signal for detecting the peak-to-peak voltage amplitude of the signal. This includes a diode 24 which may be of theg ermanium crystal type, a resistor 25, and a capacitor 26, coupled in series and in the order stated from the control grid of pentode 20 to the source of fixed potential, ground. The diode 24 is connected so that its low impedance direction corresponds to conventional current flow toward the control grid of pentode 20. The junction between the resistor 25 and the capacitor 26 is connected via two resistors 27 and 28 in series to a variable tapping point on a potentiometer 29, potentiometer 29 being connected across voltage source +B and ground. The junction between resistors 27 and 28 is connected to ground through a germanium crystal diode 30, diode 30 being shunted by a capacitor 31 and being connected so that its low impedance direction corresponds to conventional current flow to ground. The junction between resistors 27 and 28 is connected to output terminal 15*c*, whereby the arrangement to the left of capacitor 26 constitutes means for deriving an output voltage from across capacitor 26.

In operation, the control grid and cathode of pentode 20 act effectively as a diode so that capacitor 19 charges substantially to the voltage at the positive peaks of the television signal appearing at the output of video-frequency amplifier 13. The impedance between the control grid of pentode 20 and ground is such that the discharge time of capacitor 19 is long compared with the period of one line of the television signal so capacitor 19 substantially maintains its charge between the peaks of the television signal. The television signal appearing at the control grid of pentode 20 is, therefore, negative-going with respect to ground, the control grid being substantially at ground potential during the synchronizing pulses. The direct-current component of the television signal is thus present at the grid of pentode 20. The amplitude of the television signal appearing at the control grid of pentode 20 is such that pentode 20 is cut off except during the occurrence of the synchronizing pulses. Signals representative only of the synchronizing pulses therefore appear across load resistor 23 and at the junction of the resistors 21 and 22, these signals being utilized to synchronize respectively in line- and field-scan signal-generating circuits 16 and 17.

Capacitor 26 charges up through the diode 24 and resistor 25 substantially to the voltage at the negative-going peaks of the television signal appearing at the control grid of pentode 20. The impedance across capacitor 26 is such that it effectively maintains its charge between the peaks of the television signal, that is, substantially longer than the line-frequency rate of the television signal. The voltage appearing across capacitor 26 is, therefore, substantially proportional to the peak level of the received television signal, but varies only relatively slowly with changes in the peak level of the received television signal due to the slow discharge time of capacitor 26.

Resistor 27 and capacitor 31 together form a low-pass filter so that across capacitor 31 there appears a smoothed unidirectional voltage whose magnitude varies with the peak level of the received television signal. This voltage is applied to circuits 11 where it is utilized in conventional manner for automatic-gain-control purposes as previously mentioned. It will be appreciated that the actual magnitude of the voltage appearing across capacitor 31 is approximately equal to the voltage across capacitor 26 minus the delay voltage applied by potentiometer 29 and resistor 28. Potentiometer 29, in fact, constitutes the "contrast" control of the receiver.

The purpose of diode 30 is to prevent the voltage fed back to circuits 11 from becoming positive with respect to ground.

The arrangement has the advantage that a large control voltage for automatic-gain-control purposes may be derived so that the automatic-gain-control characteristic of the receiver is improved.

While applicants do not wish to be limited to any particular circuit constants, the following have proved useful in the embodiment of the invention shown in the drawing:

| | |
|---|---|
| Pentode 20 | Type Z329 supplied by The General Electric Co. Ltd. |
| Diode 24 | Type GEX34 supplied by The General Electric Co. Ltd. |
| Resistor 25 | 47 kilohms. |
| Resistor 27 | 220 kilohms. |
| Resistor 28 | 1 megohm. |
| Potentiometer 29 | 100 kilohms. |
| Capacitor 19 | 0.5 microfarad. |
| Capacitor 26 | 0.1 microfarad. |
| Capacitor 31 | 0.001 microfarad. |

While there has been described what is at present considered to be the preferred embodiment of the present invention, it will be obvious to those skilled in the art that various changes and modifications may be made therein without departing from the invention, and it is, therefore, aimed to cover all such changes and modifications as fall within the true spirit and scope of the invention.

What is claimed is:

An automatic-gain-control circuit for a television receiver, comprising:

means including a detector circuit and an amplifier circuit for supplying from the output of the amplifier circuit a composite television signal, including synchronizing and video components, with a higher composite peak-to-peak amplitude than at the output of said detector circuit;

synchronizing separator means responsive to said amplified composite television signal and including an electron valve having a grid-cathode rectification circuit for developing said composite signal across said rectification circuit with the peaks of said synchronizing components set at a fixed potential level;

and a second rectification circuit responsive to said level-set signal and being coupled across said grid-cathode rectification circuit for developing an automatic-gain-control effect proportional to the peak-to-peak amplitude of said amplified composite television signal.

References Cited in the file of this patent

UNITED STATES PATENTS

| | | |
|---|---|---|
| 2,240,600 | Applegarth | May 6, 1941 |
| 2,792,496 | Rhodes | May 14, 1957 |
| 2,875,277 | Cope | Feb. 24, 1959 |
| 2,880,272 | Sink | Mar. 31, 1959 |
| 2,885,472 | Billin | May 5, 1959 |
| 2,934,602 | Cope | Apr. 26, 1960 |
| 2,978,539 | Fisher | Apr. 4, 1961 |

FOREIGN PATENTS

| | | |
|---|---|---|
| 822,883 | Great Britain | Nov. 4, 1959 |